United States Patent
Jin

(10) Patent No.: US 8,973,103 B2
(45) Date of Patent: Mar. 3, 2015

(54) IMAGE FORMING APPARATUS, LICENSE SERVER, TERMINAL APPARATUS, METHOD FOR INSTALLING APPLICATION, AND METHOD FOR PROVIDING APPLICATION FILE

(71) Applicant: Samsung Electronics Co., Ltd., Gyeonggi-do (KR)

(72) Inventor: Song-baik Jin, Seoul (KR)

(73) Assignee: Samsung Electronics Co., Ltd., Suwon-Si, (KR)

( * ) Notice: Subject to any disclaimer, the term of this patent is extended or adjusted under 35 U.S.C. 154(b) by 0 days.

(21) Appl. No.: 13/664,510

(22) Filed: Oct. 31, 2012

(65) Prior Publication Data

US 2013/0111564 A1 May 2, 2013

(30) Foreign Application Priority Data

Oct. 31, 2011 (KR) .................. 10-2011-0112554

(51) Int. Cl.
  *G06F 7/04* (2006.01)
  *G06F 21/00* (2013.01)
  *H04N 1/44* (2006.01)

(52) U.S. Cl.
  CPC ...... *H04N 1/4413* (2013.01); *H04N 2201/3236* (2013.01)
  USPC .............................. 726/4; 705/59

(58) Field of Classification Search
  USPC .............................. 726/4; 705/59
  See application file for complete search history.

(56) References Cited

U.S. PATENT DOCUMENTS

| | | | |
|---|---|---|---|
| 6,169,976 B1 | 1/2001 | Colosso | |
| 2002/0174356 A1 | 11/2002 | Padole et al. | |
| 2003/0053815 A1 | 3/2003 | Testardi et al. | |
| 2004/0128395 A1* | 7/2004 | Miyazaki | 709/229 |
| 2005/0185792 A1* | 8/2005 | Tokutani et al. | 380/30 |
| 2008/0005029 A1 | 1/2008 | Ando | |
| 2008/0301447 A1 | 12/2008 | Hughes et al. | |
| 2010/0162407 A1 | 6/2010 | Hosoda | |
| 2010/0195133 A1* | 8/2010 | Adkins et al. | 358/1.14 |
| 2010/0293103 A1* | 11/2010 | Nikitin et al. | 705/80 |
| 2010/0293536 A1* | 11/2010 | Nikitin et al. | 717/168 |
| 2010/0293622 A1* | 11/2010 | Nikitin et al. | 726/31 |
| 2011/0321172 A1* | 12/2011 | Maeda et al. | 726/27 |

OTHER PUBLICATIONS

Extended European Search Report issued Oct. 30, 2014 in European Patent Application No. 12183073.1.

* cited by examiner

*Primary Examiner* — Teshome Hailu
(74) *Attorney, Agent, or Firm* — Staas & Halsey LLP

(57) ABSTRACT

An image forming apparatus. The image forming apparatus includes: a communication interface which receives an application file containing an activation key, an installation unit which installs the received application file in the image forming apparatus, an authentication unit which authenticates a license of application corresponding to the application file using the activation key contained in the application file and apparatus information of the image forming apparatus, and a controller which, if the license is authenticated, activates the installed application, wherein the activation key is an encryption key that is generated using the apparatus information of the image forming apparatus.

21 Claims, 10 Drawing Sheets

IMAGE FORMING APPARATUS, LICENSE SERVER, TERMINAL APPARATUS, METHOD FOR INSTALLING APPLICATION, AND METHOD FOR PROVIDING APPLICATION FILE

CROSS-REFERENCE TO RELATED APPLICATIONS

This application claims priority benefit from Korean Patent Application No. 10-2011-0112554, filed on Oct. 31, 2011 in the Korean Intellectual Property Office, the disclosure of which is incorporated herein by reference in its entirety.

BACKGROUND

1. Field

Methods and apparatuses consistent with exemplary embodiments relate to an image forming apparatus, a license server, a terminal apparatus, a method for installing an application, and a method for providing an application file, and more particularly, to an image forming apparatus, a license server, a terminal apparatus, a method for installing an application, and a method for providing an application file, which can install an application using an application file containing an activation key.

2. Description of the Related Art

An image forming apparatus refers to an apparatus that prints printing data generated by a terminal apparatus, such as a computer, on recording paper. Examples of such an image forming apparatus are copiers, printers, facsimile machines, or multifunction peripherals (MFPs) complexly realizing the functions of the aforementioned devices in a single device.

In recent years, it has become possible to install a variety of applications capable of extending functions of the image forming apparatus in the image forming apparatus. In addition, when installing an application, a license activating method is used in order to activate a specific function or prevent illegal copying.

Since the license activating method activates the application using an activation key that is generated using unique information of the image forming apparatus, the activation key cannot be used to activate a license if it is used in another image forming apparatus.

There have been three license activating methods in the related art as follows: The first method uses a license server, the second method is a license off line method, and the third method is a universal serial bus (USB) license off line method.

The first method which uses the license server is used when the image forming apparatus is connected to the license server. If a user selects an application to be installed, the image forming apparatus receives a license key for the corresponding application from the user, provides the received license key and unique information of the image forming apparatus to the license server, receives an activation key from the license server in response to the license key and the unique information of the image forming apparatus, and activates the application using the received activation key.

The license off line method is applied to an image forming apparatus that cannot access a license server because a network environment is not established. Apparatus information of the image forming apparatus is collected by a user, and an activation key to be used for activation at the image forming apparatus is manually issued. A license key and the activation key are inputted to the image forming apparatus and are used to activate a license.

The USB license off line method is also applied to an image forming apparatus that cannot access a license server because a network environment is not established. In this method, apparatus information of the image forming apparatus in which an application is to be installed is collected by a user and an activation key to be used for activation at the image forming apparatus is manually issued. The issued activation key is stored in a USB and the USB in which the activation key is stored is connected to the image forming apparatus, so that a license is activated.

The related-art license activating methods described above has the following problems. Specifically, the first method, which uses the license server, should connect the image forming apparatus and the license server to each other. However, if the image forming apparatus is not allowed to be connected to the license server, the license is not activated. In particular, in a general Business-to-Business (B2B) environment, the image forming apparatus is not allowed to access the external license server for reasons of security. Therefore, this method is not efficiently used and the user suffers inconvenience of having to perform license activation for every image forming apparatus.

In a B2B environment in which an application should be installed in a plurality of image forming apparatuses, the second license off line method suffers from problems in that activation keys for the image forming apparatuses should be inputted one by one and it takes a long time to install an application.

The third USB off line method has problems in that it takes long time to install an application in a B2B environment in which an application should be installed in a plurality of image forming apparatuses, and that this method could not be used in a situation where a USB cannot be used for reasons of security.

SUMMARY

Additional aspects and/or advantages will be set forth in part in the description which follows and, in part, will be apparent from the description, or may be learned by practice of the disclosure.

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image forming apparatus, a license server, a terminal apparatus, a method for installing an application, and a method for providing an application file, which can install an application using an application file containing an activation key.

According to an aspect of an exemplary embodiment, there is provided an image forming apparatus, including: a communication interface which receives an application file containing an activation key, an installation unit which installs the received application file in the image forming apparatus, an authentication unit which authenticates a license of application corresponding to the application file using the activation key contained in the application file and apparatus information of the image forming apparatus, and a controller which, if the license is authenticated, activates the installed application, wherein the activation key is an encryption key that is generated using the apparatus information of the image forming apparatus.

The application file may contain a plurality of activation keys, and the authentication unit may perform license authentication with respect to each of the plurality of activation keys.

The apparatus information may be a serial number of the image forming apparatus.

If the license is not authenticated, the controller may activate the application, limiting functions of the application in whole or in part.

If the license is not authenticated, the controller may delete the installed application.

The communication interface may receive the application file containing the activation key through at least one of a portable storage medium, a license server, and a terminal apparatus connectable to the license server.

According to an aspect of another exemplary embodiment, there is provided a license server which is connectible to at least one of a terminal apparatus and an image forming apparatus, the license server including: a communication interface which receives license information of an application to be installed in the image forming apparatus and apparatus information of the image forming apparatus, a key generator which generates an activation key based on the license information and the apparatus information, and a file generator which generates an application file containing the generated activation key, wherein the communication interface provides the generated application file to the image forming apparatus.

The apparatus information may be a serial number of the image forming apparatus.

According to an aspect of another exemplary embodiment, there is provided a terminal apparatus which is connectable to an image forming apparatus and a license server, the terminal apparatus including: an information collector which obtains apparatus information of the image forming apparatus, a user interface which selects an application to be installed in the image forming apparatus, and a communication interface which transmits license information of the application and the apparatus information of the image forming apparatus to the license server and receives an application file containing activation information, wherein the communication interface provides the application file to the image forming apparatus.

The terminal apparatus may be connectable to a plurality of image forming apparatuses, and the information collector may obtain apparatus information of the plurality of image forming apparatuses. The communication interface may transmit license information of an application to be installed in the plurality of image forming apparatuses and the apparatus information of the plurality of image forming apparatuses to the license server, may receive an application file for each of the plurality of image forming apparatuses, and may provide the application file to the image forming apparatus corresponding to the application file.

According to an aspect of another exemplary embodiment, there is provided a method for installing an application of an image forming apparatus, the method including: receiving an application file containing an activation key, installing the received application file in the image forming apparatus, authenticating a license of application corresponding to the application file using the activation key contained in the application file and apparatus information of the image forming apparatus, and, if the license is authenticated, activating the installed application, wherein the activation key is an encryption key that is generated using the apparatus information of the image forming apparatus.

The application file may contain a plurality of activation keys, and the authenticating may include performing license authentication with respect to each of the plurality of activation keys.

The apparatus information may be a serial number of the image forming apparatus.

The activating may further include, if the license is not authenticated, activating the application, limiting functions of the application in whole or in part.

The method may further include, if the license is not authenticated, deleting the installed application.

The receiving may include receiving the application file containing the activation key through at least one of a portable storage medium, a license server, and a terminal apparatus connectable to the license server.

According to an aspect of another exemplary embodiment, there is provided a method for providing an application file of a license server which is connectable to at least of a terminal apparatus and an image forming apparatus, the method including: receiving license information of an application to be installed in the image forming apparatus and apparatus information of the image forming apparatus, generating an activation key based on the license information and the apparatus information, generating an application file containing the generated activation key, and providing the generated application file to the image forming apparatus.

The apparatus information may be a serial number of the image forming apparatus.

According to an aspect of another exemplary embodiment, there is provided a method for providing an application file of a terminal apparatus which is connectable to an image forming apparatus and a license server, the method including: obtaining apparatus information of the image forming apparatus, selecting an application to be installed in the image forming apparatus, transmitting license information of the application and the apparatus information of the image forming apparatus to the license server, receiving an application file containing activation information, and providing the received application file to the image forming apparatus.

The terminal apparatus may be connectible to a plurality of image forming apparatuses, the obtaining may include obtaining apparatus information of the plurality of image forming apparatuses, and the transmitting may include transmitting license information of an application to be installed in the plurality of image forming apparatuses and the apparatus information of the plurality of image forming apparatuses to the license server. The receiving may include receiving an application file for each of the plurality of image forming apparatuses and the providing may include providing the application file to the image forming apparatus corresponding to the application file.

According to an aspect of another exemplary embodiment, there is provided a computer readable recording medium including a program to execute a method for installing an application of an image forming apparatus, the method including: receiving an application file containing an activation key, installing the received application file in the image forming apparatus, authenticating a license of the application using the activation key contained in the application file and apparatus information of the image forming apparatus, and, if the license is authenticated, activating the installed application, wherein the activation key is an encryption key that is generated using the apparatus information of the image forming apparatus.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
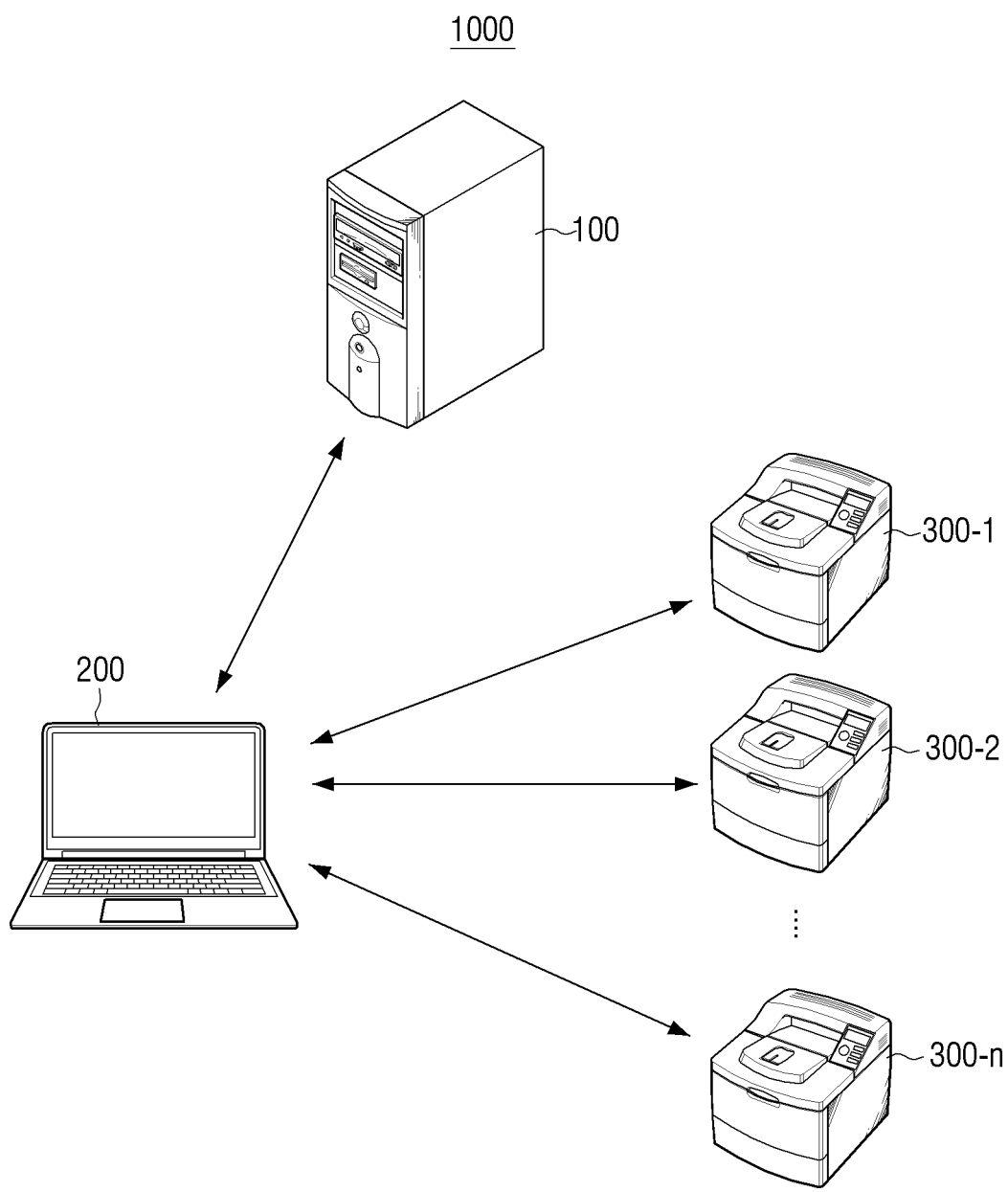
FIG. 1 is a block diagram illustrating an application installing system, according to an exemplary embodiment.

Reference will now be made in detail to the embodiments, examples of which are illustrated in the accompanying drawings, wherein like reference numerals refer to the like elements throughout. The embodiments are described below to explain the present disclosure by referring to the figures.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. In addition, functions or elements known in the related art are not described in detail since they would obscure the exemplary embodiments with unnecessary detail.

FIG. 1 is a block diagram illustrating an application installing system, according to an exemplary embodiment.

Referring to FIG. 1, an application installing system 1000 includes a license server 100, a terminal apparatus 200, and a plurality of image forming apparatuses 300-1, 300-2 ... 300-n.

The license server 100 generates an application file corresponding to an application and provides the generated application file to the image forming apparatuses 300-1, 300-2 ... 300-n. Specifically, the license server 100 generates an activation key using apparatus information of the image forming apparatuses 300-1, 300-2 ... 300-n and a license key of the license server 100, and generates the application file containing the activation key. The license server 100 may directly provide the application file to the image forming apparatuses 300-1, 300-2 ... 300-n or provide the application file to the terminal apparatus 200 so that the terminal apparatus 200 provides the application file to the image forming apparatuses 300-1, 300-2 ... 300-n. A detailed configuration and operation of the license server 100 will be explained below with reference to FIG. 2.

The terminal apparatus 200 collects license information of the application to be installed in the image forming apparatuses 300-1, 300-2 ... 300-n and the apparatus information of the image forming apparatuses 300-1, 300-2 ... 300-n, and provides the license information and the apparatus information to the license server 100. The terminal apparatus 200 may receive the application file from the license server 100 and transmit the application file to the image forming apparatuses 300-1, 300-2 ... 300-n. A detailed configuration and operation of the terminal apparatus 200 will be explained below with reference to FIG. 3.

The image forming apparatuses 300-1, 300-2 ... 300-n receive the application file and install the application file. Specifically, the image forming apparatuses 300-1, 300-2 ... 300-n may receive the application file containing the activation key from the terminal apparatus 200, install the application using the application file, and perform license authentication for the installed application using the activation key contained in the application file. A detailed configuration and operation of the image forming apparatuses 300-1, 300-2 ... 300-n will be explained below with reference to FIG. 4.

In FIG. 1, the image forming apparatuses 300-1, 300-2 ... 300-n are not directly connected to the license server 100. However, if the image forming apparatuses 300-1, 300-2 ... 300-n are directly connected to the license server 100, the image forming apparatus 300-1, 300-2 ... 300-n may directly transmit the license information and the apparatus information and may directly receive the application file containing the activation key.

Figure 2:
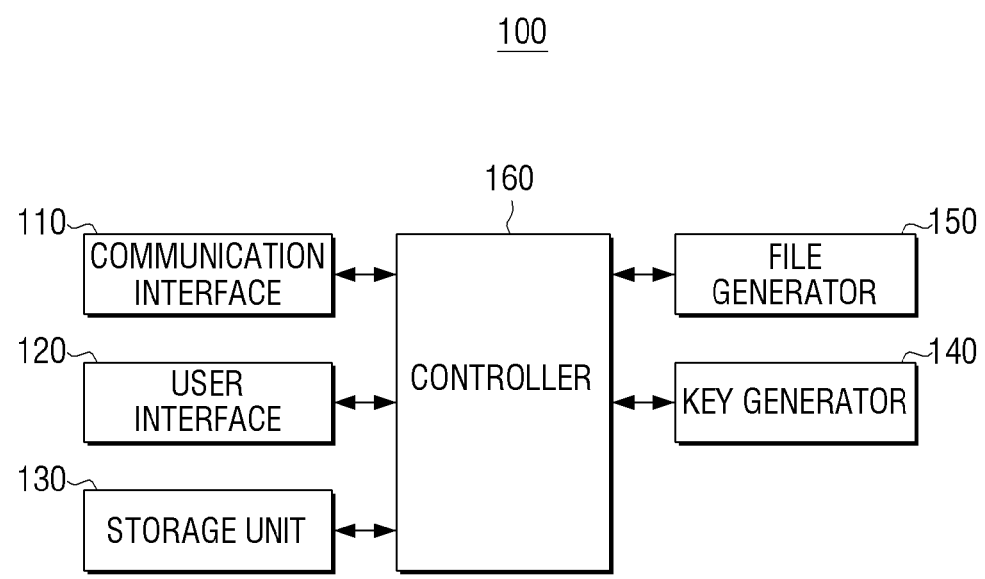
FIG. 2 is a block diagram illustrating a license server of FIG. 1.

FIG. 2 is a block diagram illustrating the license server of FIG. 1.

Referring to FIG. 2, the license server 100 may include a communication interface 110, a user interface 120, a storage unit 130, a key generator 140, a file generator 150, and a controller 160.

The communication interface 110 is connected to the terminal apparatus 200. Specifically, the communication interface 110 is adapted to connect the license server 100 to an external apparatus and may access the terminal apparatus 200 through a local area network (LAN) or the internet or may access the terminal apparatus 200 through a universal serial bus (USB) port or in a wireless communication method.

The communication interface 110 receives the license information of the application to be installed in the image forming apparatuses 300-1, 300-2 ... 300-n and the apparatus information of the image forming apparatuses 300-1, 300-2 ... 300-n. Specifically, the communication interface 110 may receive information of the application to be installed in the image forming apparatuses 300-1, 300-2 ... 300-n (specifically, license information of the application to be installed) and information of the image forming apparatuses 300-1, 300-2 ... 300-n (for example, serial information of the image forming apparatuses 300-1, 300-2 ... 300-n) from the terminal apparatus 200. The serial information is an identification number that is assigned to each of the image forming apparatuses 300-1, 300-2 ... 300-n. Although only the serial information is used in the present exemplary embodiment, any other information that can identify the image forming apparatuses 300-1, 300-2 ... 300-n may be used.

The communication interface 110 may provide a user interface window to the terminal apparatus 200 to receive the license information and the apparatus information. That is, the terminal apparatus 200 accesses a specific internet address and the license server 100 provides an internet window to the terminal apparatus 200 to receive the license information and the apparatus information, so that license server 100 receives the license information and the apparatus information.

The communication interface 110 may transmit the generated application file to the terminal apparatus 200. Specifically, the communication interface 110 may transmit the application file generated by the file generator 150, which will be described later, to the terminal apparatus 200. Although the application file is transmitted to the terminal apparatus 200 in the present exemplary embodiment, the communication interface 110 may directly transmit the application file to the image forming apparatus 300-1, 300-2 ... 300-n in the case that the license server 100 is directly connected to the image forming apparatuses 300-1, 300-2 ... 300-n.

The user interface 120 includes a plurality of function keys through which a user sets or selects various functions supported by the license server 100, and may display a variety of information provided by the license server 100. The user interface 120 may be realized by a device performing input and output simultaneously, such as, a touch pad or may be realized by a device combining a mouse and a monitor.

The user interface 120 may display an activation history. Specifically, the user interface 120 may display an activation history on the application installed in the image forming apparatuses 300-1, 300-2 ... 300-n through a user interface window. For example, the user interface 120 may display an installation ratio of a specific application and statistical information on an image forming apparatus in which a specific application has never been installed.

The storage unit 130 stores various application data. The application data recited herein refers to data that is necessary for generating the application file to be installed in the image forming apparatuses 300-1, 300-2 ... 300-n.

The storage unit 130 stores a variety of information relating to a license. Specifically, the storage unit 130 may store a name of the application, license information issued about the corresponding application, and information of the activation key generated by the key generator 140, which will be described below. Such information may be updated while the application is being distributed and may be used as the statistical information as described above.

The storage unit 130 may store the generated application file. Specifically, the storage unit 130 may temporarily store the application file generated by the file generator 150, which will be described later.

The storage unit 130 may be realized by an internal storage medium or an external storage medium of the license server 100, for example, a removable disk including a USB memory or a web server over a network.

The key generator 140 generates the activation key based on the license information and the apparatus information. Specifically, the key generator 140 may generate the activation key using the license information and the apparatus information received through the communication interface 110. The activation key is an encryption key that is generated using the apparatus information of the image forming apparatuses 300-1, 300-2 ... 300-n. The operation of generating the activation key using the apparatus information is the same as in the related art, and thus, a detailed description thereof is omitted here. A plurality of pieces of license information may be provided for one application. In this case, the key generator 140 may generate a plurality of activation keys.

The file generator 150 generates the application file containing the activation key. Specifically, the file generator 150 may generate the application file by including the activation key generated by the key generator 140 in the application data stored in the storage unit 130. For example, the activation key may be added to a specific data area of the application data or the application data and the activation key may be compressed, thereby generating one application file.

The controller 160 controls the elements of the license server 100. Specifically, if the apparatus information of the image forming apparatuses 300-1, 300-2 ... 300-n and the license information are received through the communication interface 110, the controller 160 may control the key generator 140 to generate the activation key. The controller 160 may control the file generator 150 to generate the application file containing the activation key. The controller 160 may control the communication interface 110 to transmit the application file to the terminal apparatus 200 or the image forming apparatuses 300-1, 300-2 ... 300-n.

Although the key generator 140 and the file generator 150 are separate elements in the present exemplary embodiment, the function of the key generator 140 and the function of the file generator 150 described above may be realized in one element. In addition, the key generator 140, the file generator 150, and the controller 160 may be realized in one element.

As described above, the license server 100 according to the exemplary embodiment generates the application file containing the activation key and provides the application file to the terminal apparatus 200 or the image forming apparatuses 300-1, 300-2 ... 300-n, so that the image forming apparatuses 300-1, 300-2 ... 300-n can activate the application without receiving a separate license key and a separate activation key.

Figure 3:
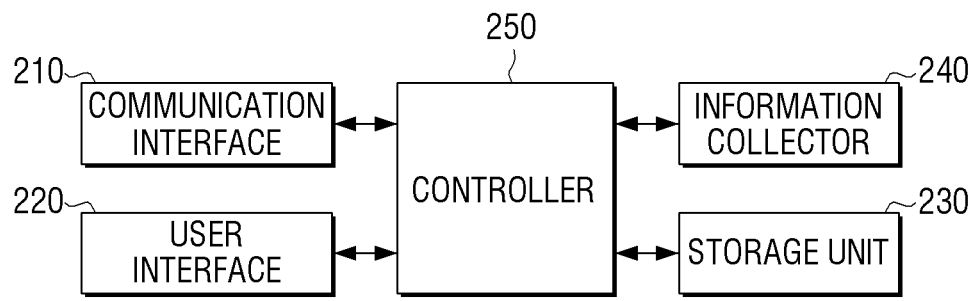
FIG. 3 is a block diagram illustrating a terminal apparatus of FIG. 1.

FIG. 3 is a block diagram illustrating the terminal apparatus of FIG. 1.

Referring to FIG. 3, the terminal apparatus 200 includes a communication interface 210, a user interface 220, a storage unit 230, an information collector 240, and a controller 250. The terminal apparatus 200 according to the exemplary embodiment may be realized by a notebook computer, a personal computer, or a management server, which can access the internet.

The communication interface 210 is connected to the license server 100 and the plurality of image forming apparatuses 300-1, 300-2 ... 300-n. Specifically, the communication interface 210 is adapted to connect the terminal apparatus 200 to an external apparatus and may access the license server 100 and the image forming apparatuses 300-1, 300-2 ... 300-n through a LAN or the internet or may access the license server 100 and the image forming apparatuses 300-1, 300-2 ... 300-n through a USB port or a wireless communication method, for example, 2G, 3G, or wibro.

The communication interface 210 receives the apparatus information of the image forming apparatuses 300-1, 300-2 ... 300-n. Specifically, the communication interface 210 may receive the apparatus information (for example, serial information) of the image forming apparatuses 300-1, 300-2 ... 300-n from the image forming apparatuses 300-1, 300-2 ... 300-n. The serial information is an identification number that is assigned to each of the image forming apparatuses 300-1, 300-2 ... 300-n. Although the serial information is used in the present exemplary embodiment, any other information that can identify each of the image forming apparatuses 300-1, 300-2 ... 300-n may be used. Although the apparatus information is received from the image forming apparatuses 300-1, 300-2 ... 300-n in the present exemplary embodiment, the apparatus information of the image forming apparatuses 300-1, 300-2 ... 300-n may be inputted through the user interface 220.

The communication interface 210 may transmit the apparatus information of the image forming apparatuses 300-1, 300-2 ... 300-n and the license information of the application to be installed in the image forming apparatuses 300-1, 300-2 ... 300-n to the license server 100. Specifically, the communication interface 210 may transmit the license information input through the user interface 220, which will be described later, and the collected apparatus information of the image forming apparatuses 300-1, 300-2 . . . 300-n to the license server 100. At this time, if the application is to be installed in the plurality of image forming apparatuses 300-1, 300-2 . . . 300-n, a plurality of pieces of apparatus information of the plurality of image forming apparatuses 300-1, 300-2 . . . 300-n may be transmitted to the license server 100.

The communication interface 210 receives the application file. Specifically, the communication interface 210 may receive the application file containing the activation key in response to the transmission of the license information and the apparatus information. If the plurality of pieces of the apparatus information is transmitted to the license server 100, the communication interface 210 may receive application files for the respective image forming apparatuses 300-1, 300-2 . . . 300-n.

The communication interface 210 may transmit the application file to the image forming apparatus 300-1, 300-2 . . . 300-n. If the plurality of application files are received, the communication interface 210 may transmit the application files corresponding to the image forming apparatuses 300-1, 300-2 . . . 300-n to the image forming apparatuses 300-1, 300-2 . . . 300-n individually. Although the application file is directly transmitted to the image forming apparatuses 300-1, 300-2 . . . 300-n in the present exemplary embodiment, the application file may be transmitted to the image forming apparatuses 300-1, 300-2 . . . 300-n through a portable storage medium such as a USB.

The user interface 220 includes a plurality of function keys through which the user sets or selects various functions supported by the terminal apparatus 200, and may display a variety of information provided by the terminal apparatus 200. The user interface 220 may be realized by a device performing input and output simultaneously, such as, a touch pad, or may be realized by a device combining a mouse and a monitor.

The user interface 220 may display a user interface window to receive the license information. The user interface 220 may display a user interface window to receive the license information and the apparatus information of the image forming apparatuses 300-1, 300-2 . . . 300-n. An example of the user interface window displayable by the user interface 220 will be described below with reference to FIG. 6. The user interface window may be an internet window and may be provided by the license server 100. That is, the terminal apparatus 200 may access a specific internet address and displays a user interface window provided by the license server 100 so that the terminal apparatus 200 may receive the license information and the apparatus information.

The storage unit 230 stores the collected apparatus information. Specifically, the storage unit 230 may store the apparatus information of the image forming apparatuses 300-1, 300-2 . . . 300-n collected by the information collector 240. The apparatus information may be input through the user interface 220 and the storage unit 230 may store the apparatus information input through the user interface 220.

The storage unit 230 stores the license information. Specifically, the storage unit 230 may store the license information input through the user interface window.

The storage unit 230 stores the application file. Specifically, the storage unit 230 may temporarily store the application file input through the communication interface 210.

The storage unit 230 may be realized by an internal storage medium or an external storage medium of the terminal apparatus 200, for example, a removable disk including a USB memory or a web server over a network.

The information collector 240 obtains the apparatus information of the image forming apparatuses 300-1, 300-2 . . . 300-n. Specifically, the information collector 240 requests each of the image forming apparatuses 300-1, 300-2 . . . 300-n connected to the terminal apparatus 200 to transmit the apparatus information, and receives the apparatus information (for example, serial information) from each of the image forming apparatuses 300-1, 300-2 . . . 300-n in response to the request. Although the apparatus information is obtained by requesting the apparatus information from the image forming apparatuses 300-1, 300-2 . . . 300-n in the present exemplary embodiment, the apparatus information may be directly input by an administrator.

The controller 250 controls the elements of the terminal apparatus 200. Specifically, if an application needs to be installed in the image forming apparatuses 300-1, 300-2 . . . 300-n, the controller 250 may control the information collector 240 or the user interface 220 to collect the information of the image forming apparatuses 300-1, 300-2 . . . 300-n and may control the user interface 220 to receive the license information. The controller 250 may control the communication interface 210 to transmit the apparatus information and the license information to the license server 100. If the application file is received from the license server 100, the controller 250 may control the communication interface 210 to transmit the application file to the image forming apparatus in which the application file is to be installed.

As described above, the terminal apparatus 200 according to the exemplary embodiment provides information necessary for generating the activation key to the license server 100, receives the application file containing the activation key, and provides the application file to the image forming apparatuses 300-1, 300-2 . . . 300-n. Accordingly, the image forming apparatuses 300-1, 300-2 . . . 300-n can install and activate the application easily without being connected to the license server 100.

Figure 4:
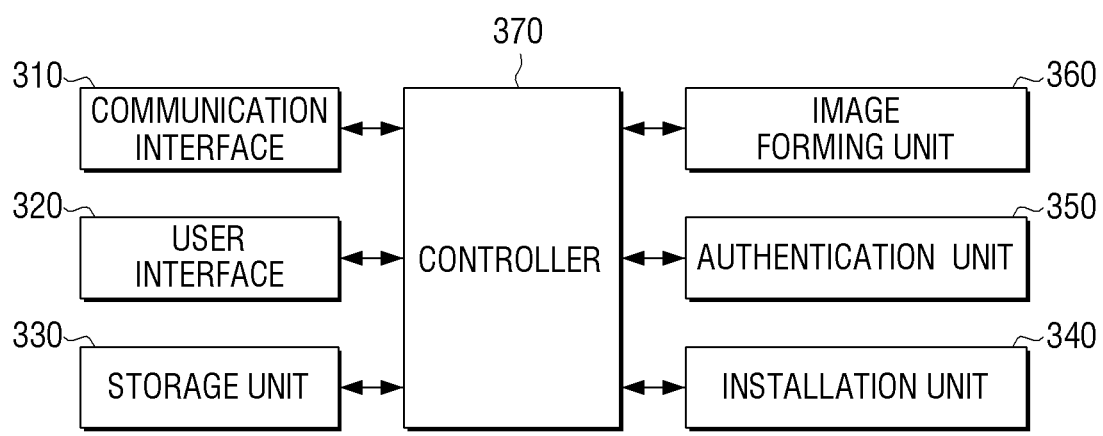
FIG. 4 is a block diagram illustrating an image forming apparatus of FIG. 1.

FIG. 4 is a block diagram illustrating the image forming apparatus of FIG. 1.

Referring to FIG. 4, the image forming apparatus 300 includes a communication interface 310, a user interface 320, a storage unit 330, an installation unit 340, an authentication unit 350, an image forming unit 360, and a controller 370.

The communication interface 310 is connected to the terminal apparatus 200 and receives the application file from the terminal apparatus 200. Specifically, the communication interface 310 is adapted to connect the image forming apparatus 300 to an external apparatus and may be a serial port, a USB port, or a wireless port. Although the communication interface 310 is connected to only the image forming apparatus 200 in the present exemplary embodiment, the communication interface 310 may be directly connected to the license server 100. In this case, the communication interface 310 may directly receive the application file from the license server 100. The application file may be an application file containing an activation key as described above or may be an application file without an activation key.

The communication interface 310 may transmit apparatus information of the image forming apparatus 300. Specifically, the communication interface 310 transmits the apparatus information (for example, serial information) of the image forming apparatus to the terminal apparatus 200 upon receiving a request for the apparatus information from the terminal apparatus 200.

The communication interface 310 may receive printing data. Specifically, the communication interface 310 may receive the printing data from the terminal apparatus 200.

The user interface 320 includes a plurality of function keys through which the user sets or selects various functions supported by the image forming apparatus 300, and may display a variety of information provided by the image forming apparatus 300. The user interface 320 may be realized by a device performing input and output simultaneously, such as, a touch pad or may be realized by a device combining a mouse and a monitor.

The user interface 320 may select an application to be installed in the image forming apparatus 300. Specifically, the user interface 320 may display the received application file on a user interface window and may receive selection of the application to be installed in the image forming apparatus 300.

The user interface 320 may receive the license information and/or the activation key. Specifically, if the application file does not contain the activation key, the user interface 320 displays a user interface window to receive the license information and/or the activation key and receives the license information and/or the activation key from the user through the user interface window in order to activate the application in the related-art method. An example of the user interface window displayable by the user interface 320 will be described below with reference to FIGS. 7 to 9.

The storage unit 330 stores the received application file. Specifically, the storage unit 330 may store the application file received through the communication interface 310. The storage unit 330 may store the received printing data. The storage unit 330 stores the apparatus information (for example, license information) of the image forming apparatus 300.

The storage unit 330 may be realized by an internal storage medium or an external storage medium of the image forming apparatus 300. For example, the storage unit 330 may be realized by a removable disk including a USB memory or a web server over a network.

The installation unit 340 installs the input application file in the image forming apparatus 300. Specifically, the installation unit 340 may install the application file input through the communication interface 310 in the image forming apparatus 300. The installation unit 340 may delete the application installed in the image forming apparatus 300.

The authentication unit 350 authenticates the license of the application using the activation key contained in the application file and the apparatus information of the image forming apparatus 300. Specifically, the authentication unit 350 determines whether the application file contains the activation key or not, and, if the application file contains the activation key, the authentication unit 350 authenticates the license of the application by comparing the activation key and the apparatus information of the image forming apparatus 300.

A plurality of activation keys may be contained in one application file. In this case, the authentication unit 350 may perform license authentication with respect to each of the plurality of activation keys contained in the application file. For example, in the case that the application file has a plurality of functions and requires a separate activation key for each function, but, the application file contains only some activation key, the authentication unit 350 may perform license authentication with respect to a function in which the activation key exists and may not perform license authentication with respect to a function in which the activation key does not exist.

If the activation key is not contained in the application file, the authentication unit 350 may control the user interface 320 to receive the license information and the activation key and authenticate the license of the application using the license information and the activation key input through the user interface 330.

With respect to the application the license of which is authenticated, the authentication unit 350 may activate the installed application. That is, the authentication unit 350 may control the function supported by the application to be operated on the image forming apparatus 300. On the other hand, with respect to the application the license of which is not authenticated, the authentication unit 350 may activate the application, limiting the functions of the application in whole or in part. Also, with respect to the application the license of which is not authenticated, the authentication unit 350 may control the installation unit 340 to delete the application.

The image forming unit 360 prints the printing data. Specifically, the image forming unit 360 performs rendering and half-toning with respect to the printing data received through the communication interface 310 to print the printing data.

The controller 370 controls the elements of the image forming apparatus 300. Specifically, if the application file is received from the communication interface 310, the controller 370 may control the installation unit 340 to install the application and may control the authentication unit 350 to activate the installed application.

As described above, the image forming apparatus 300 according to the exemplary embodiment receives the application file containing the activation key and installs and activates the application file. Accordingly, the user can activate the application without inputting separate license information and a separate activation key. In addition, the image forming apparatus is not required to input separate license information and a separate activation key, and thus, user's convenience is improved.

In explaining FIG. 4, installation of the application file precedes license authentication. However, after the license of the application has been authenticated, only the application the license of which has been authentication may be installed.

Figure 5:
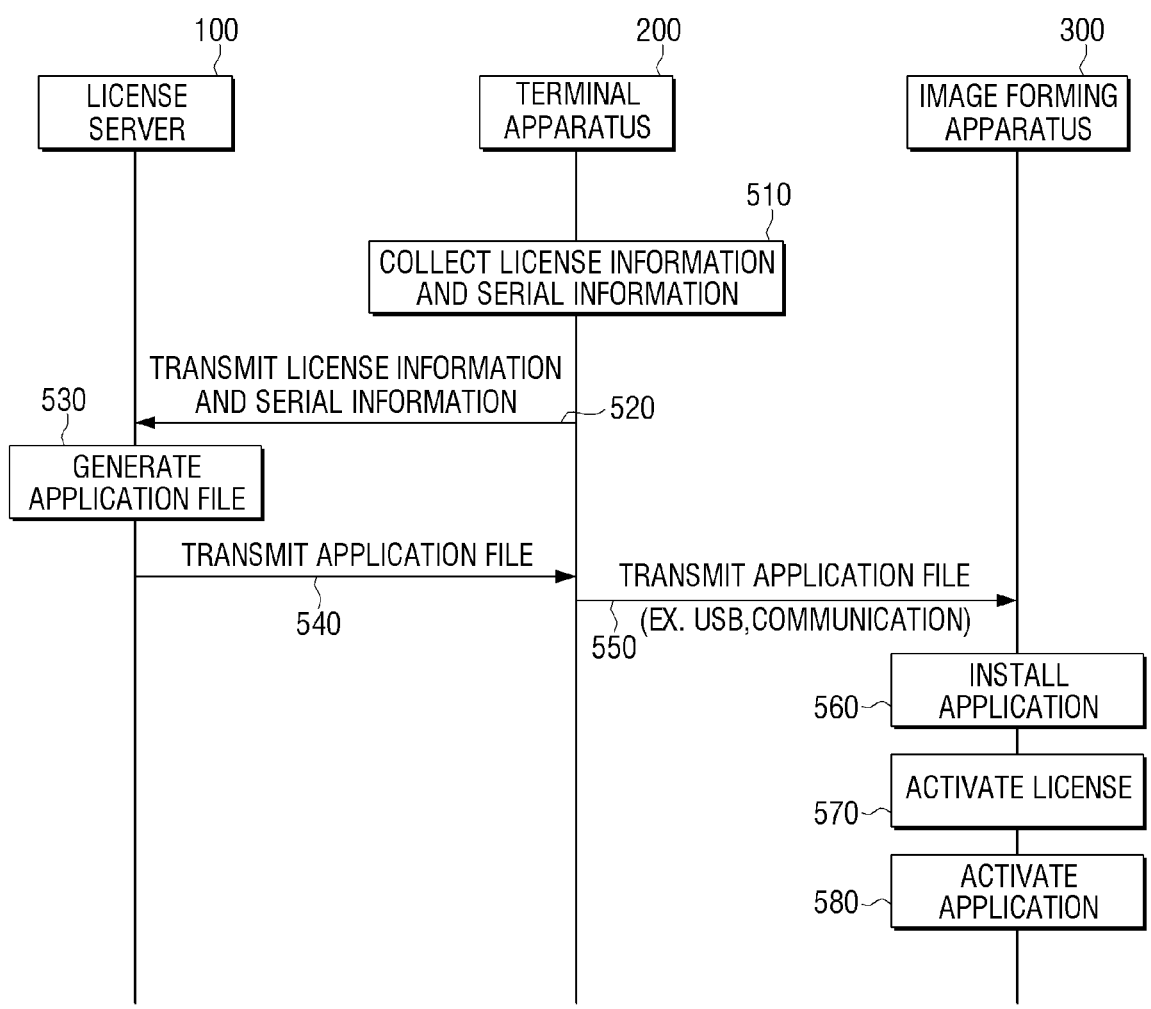
FIG. 5 is a sequence diagram illustrating an operation of installing an application, according to an exemplary embodiment.

FIG. 5 is a sequence diagram illustrating an operation of installing an application, according to an exemplary embodiment.

The terminal apparatus 200 may receive license information of an application to be installed in the image forming apparatus 300 and may collect or receive apparatus information of the image forming apparatus 300 from the image forming apparatus 300 (510).

The terminal apparatus 300 may transmit the license information and the apparatus information to the license server 100 (520).

The license server 100 which has received the license information and the apparatus information may generate an activation key using the license information and the apparatus information and may generate an application file containing the activation key (530).

If the application file containing the activation key is generated, the license server 100 may transmit the application file containing the activation key to the terminal apparatus 200 (540) and the terminal apparatus 200 may transmit the application file to the image forming apparatus 300 (550).

The image forming apparatus 300 which has received the application file containing the activation key may install the application using the application file (560), perform license authentication using the activation key contained in the application file, and activate the license of the authenticated application (570). If the license of the installed application is activated, the image forming apparatus 300 may activate the installed application. That is, the image forming apparatus 300 may provide a function of the image forming apparatus 300 using the installed application (580).

As described above, the operation of installing the application according to the exemplary embodiment provides the application file containing the activation key to the image forming apparatus 300 and the image forming apparatus 300 installs the application and performs the license authentication using the application file. Accordingly, the user can install the application and can perform the license authentication easily.

Figure 6:
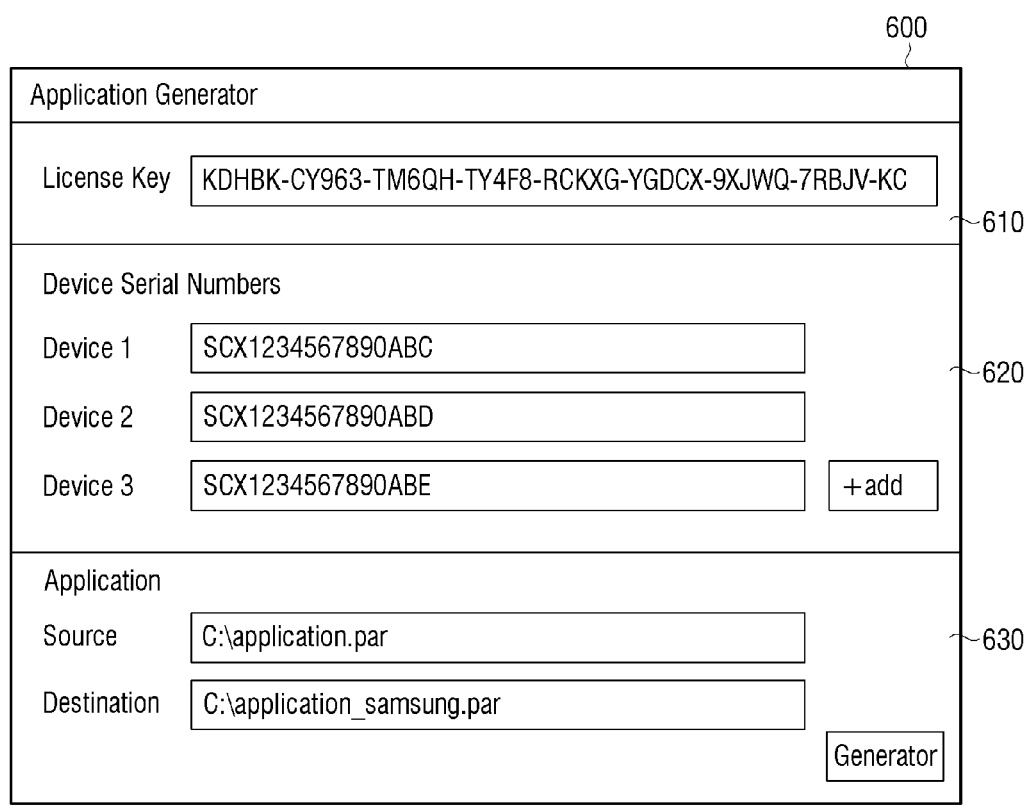
FIG. 6 is a view illustrating an example of a user interface window displayable on the terminal apparatus of FIG. 1.

FIG. 6 is a view illustrating an example of a user interface window displayable on the terminal apparatus of FIG. 1.

Referring to FIG. 6, a user interface window 600 includes a first region 610 to receive license information, a second region 620 to receive apparatus information, and a third region 630 to select an application.

The first region 610 is to receive the license information on an application to be installed in the image forming apparatus 300.

The second region 620 is to receive the apparatus information of the image forming apparatus 300 in which an application is to be installed. The apparatus information may be serial information as shown in FIG. 6 and a plurality of pieces of apparatus information on a plurality of image forming apparatuses may be input simultaneously.

The third region 630 is to select application data to be installed in the image forming apparatus 300.

Figure 7:
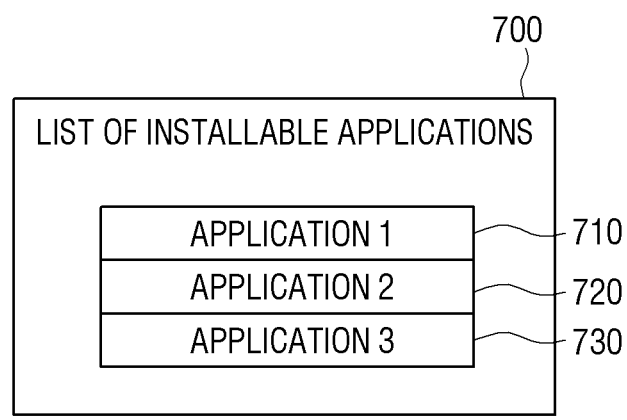
FIGS. 7 to 9 are views illustrating examples of user interface windows displayable on the image forming apparatus of FIG. 1.
Figure 8:
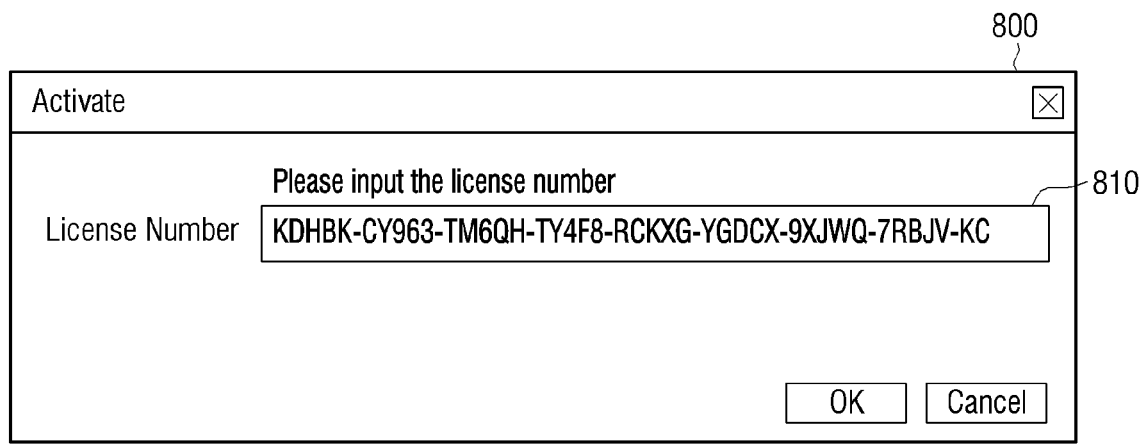
Figure 9:
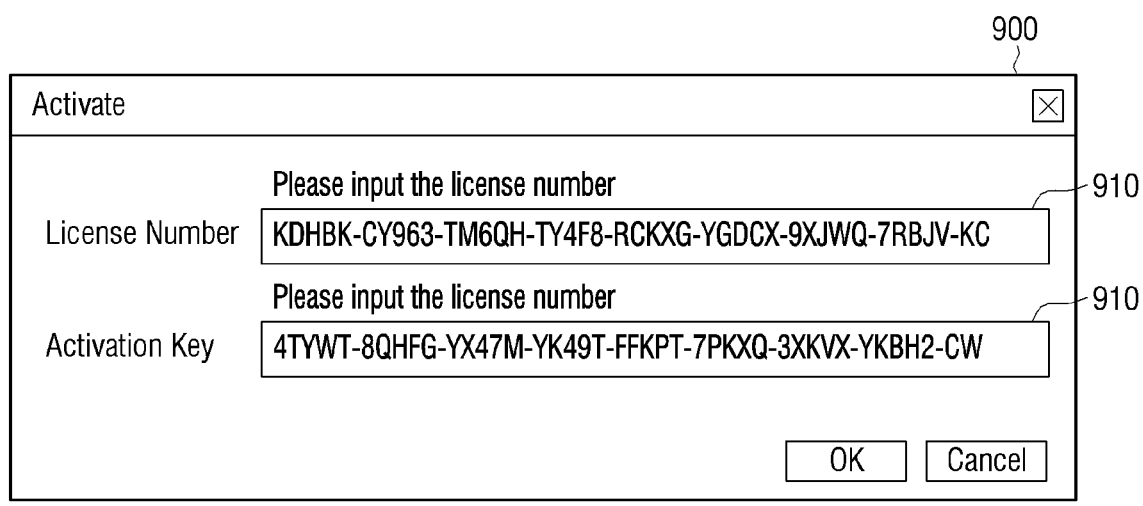

FIGS. 7 to 9 are views illustrating examples of user interface windows displayable on the image forming apparatus 300 of FIG. 1.

Referring to FIG. 7, a user interface window 700 may display application files 710, 720, and 730 to be installed in the image forming apparatus 300. The user may select an application file to be installed on the user interface window 700.

If the application file selected by the user contains an activation key, license authentication is automatically performed using the activation key contained in the application file as described above.

If the application file selected by the user does not contain the activation key, license information of the application file is inputted as shown in FIG. 8 and is transmitted to the license server 100 so that license authentication is performed.

On the other hand, if the application file selected by the user does not contain the activation key and the image forming apparatus 300 is not directly connected to the license server 100, license information and an activation key of the application file are input as shown in FIG. 9 so that authentication is performed.

Figure 10:
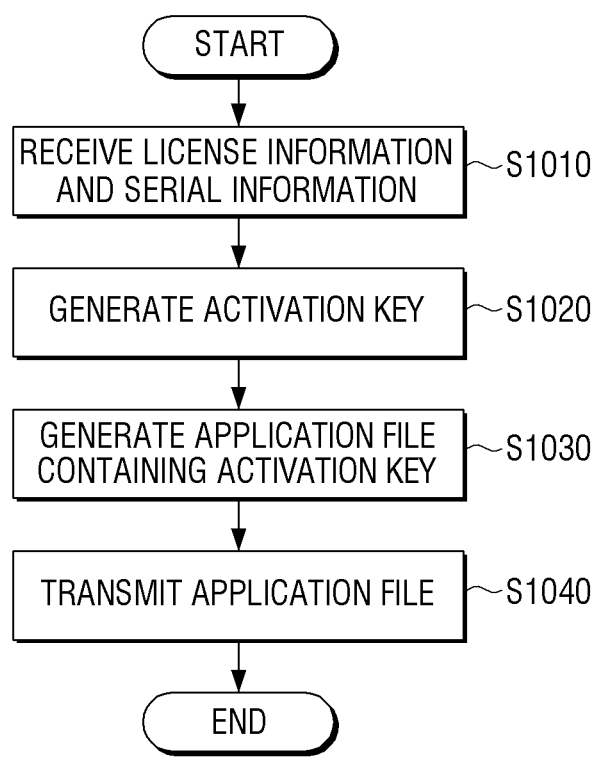
FIG. 10 is a flowchart illustrating a method for providing an application file of a license server, according to an exemplary embodiment.

FIG. 10 is a flowchart illustrating a method for providing an application file of a license server, according to an exemplary embodiment.

Referring to FIG. 10, license information of an application to be installed in the image forming apparatus 300 and apparatus information of the image forming apparatus 300 are received (S1010). Specifically, information of an application to be installed in the image forming apparatus 300 (i.e., license information of an application) and information of the image forming apparatus 300 (e.g., serial information) may be received. The serial information is an identification number that is assigned to the image forming apparatus 300. Although only the serial information is used in the present exemplary embodiment, any other information that can identify the image forming apparatus 300 may be used.

An activation key is generated based on the license information and the apparatus information (S1020). The activation key is an encryption key that is generated using the apparatus information of the image forming apparatus 300. The operation of generating the activation key using the apparatus information is the same as in the related-art, and thus, a detailed description thereof is omitted here. A plurality of pieces of license information may be provided for one application. In this case, a plurality of activation keys may be generated.

An application file containing the activation key is generated (S1030). Specifically, the application file may be generated by including the activation key in application data pre-stored in the license server 100. For example, one application file may be generated by adding the activation key to a specific data area of the application data or compressing the activation key and the application data.

The application file is provided to the image forming apparatus 300 (S1040). Specifically, the application file may be directly provided to the image forming apparatus 300 or may be provided to the image forming apparatus 300 via the terminal apparatus 200.

As described above, the method for providing the application file according to the exemplary embodiment generates the application file containing the activation key and provides the application file to the terminal apparatus 200 or the image forming apparatus 300. Accordingly, the image forming apparatus 300 can activate the application without receiving a separate license key and a separate activation key. The method for providing the application file of FIG. 10 may be embodied on the license server 100 having the configuration of FIG. 2 and may be embodied on a license server having any other configuration.

Figure 11:
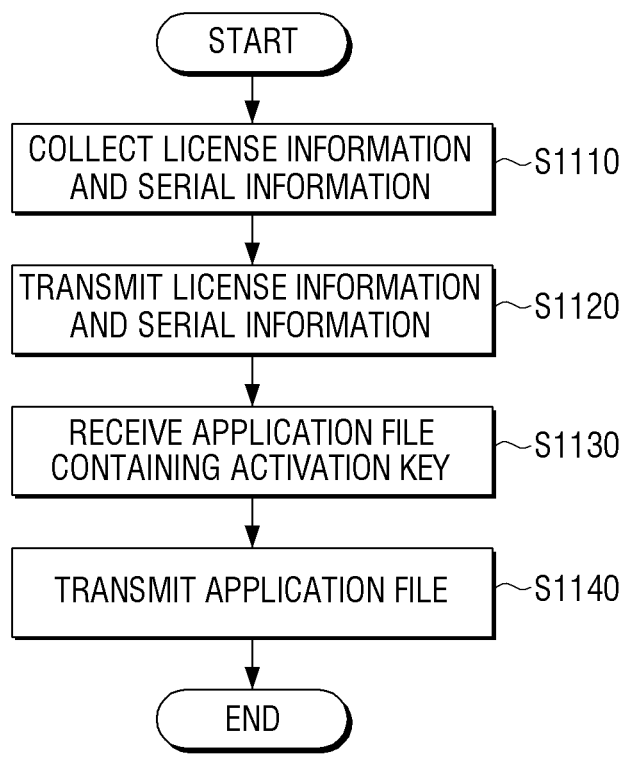
FIG. 11 is a flowchart illustrating a method for providing an application file of a terminal apparatus, according to an exemplary embodiment.

FIG. 11 is a flowchart illustrating a method for providing an application file of a terminal apparatus, according to an exemplary embodiment.

Referring to FIG. 11, apparatus information of the image forming apparatus 300 and license information are obtained (S1110). Specifically, license information of an application to be installed in the image forming apparatus 300 and apparatus information of the image forming apparatus in which the application is to be installed are inputted through a user interface window. Although the license information and the apparatus information are inputted by the user, such information may be inputted by inputting a specific data file or may be received from the image forming apparatus 300 by directly requesting the information.

The license information of the application and the apparatus information of the image forming apparatus 300 are transmitted to the license sever 100 (S1120). If there is a plurality of image forming apparatuses to install the application, a plurality of pieces of apparatus information may be transmitted to the license server 100.

An application file containing activation information is received (S1130). Specifically, an application file containing activation information corresponding to the license information and the apparatus information may be received. If the plurality of pieces of the apparatus information is transmitted to the license server 100, application files for the plurality of image forming apparatuses may be received.

The application file is provided to the image forming apparatus 300 (S1140). If a plurality of application files is received, the application files corresponding to the image forming apparatuses 300 may be transmitted to the image forming apparatuses 300 individually. Although the application file is directly transmitted to the image forming apparatus 300, the application file may be transmitted to the image forming apparatus 300 through a portable storage medium, such as, a USB.

As described above, the method for providing the application file of the terminal apparatus 200 according to the exemplary embodiment provides information necessary for generating the activation key to the license server 100, receives the application file containing the activation key, and provides the application file to the image forming apparatus 300. Accordingly, an administrator can install and activate the application easily without directly connecting the image forming apparatus 300 to the license server 100. In addition, since the image forming apparatus 300 is not required to receive separate license information and a separate activation key, user's convenience is improved. The method for providing the application file of FIG. 11 may be embodied on the terminal apparatus 200 having the configuration of FIG. 3 and may be embodied on a terminal apparatus having any other configuration.

Figure 12:
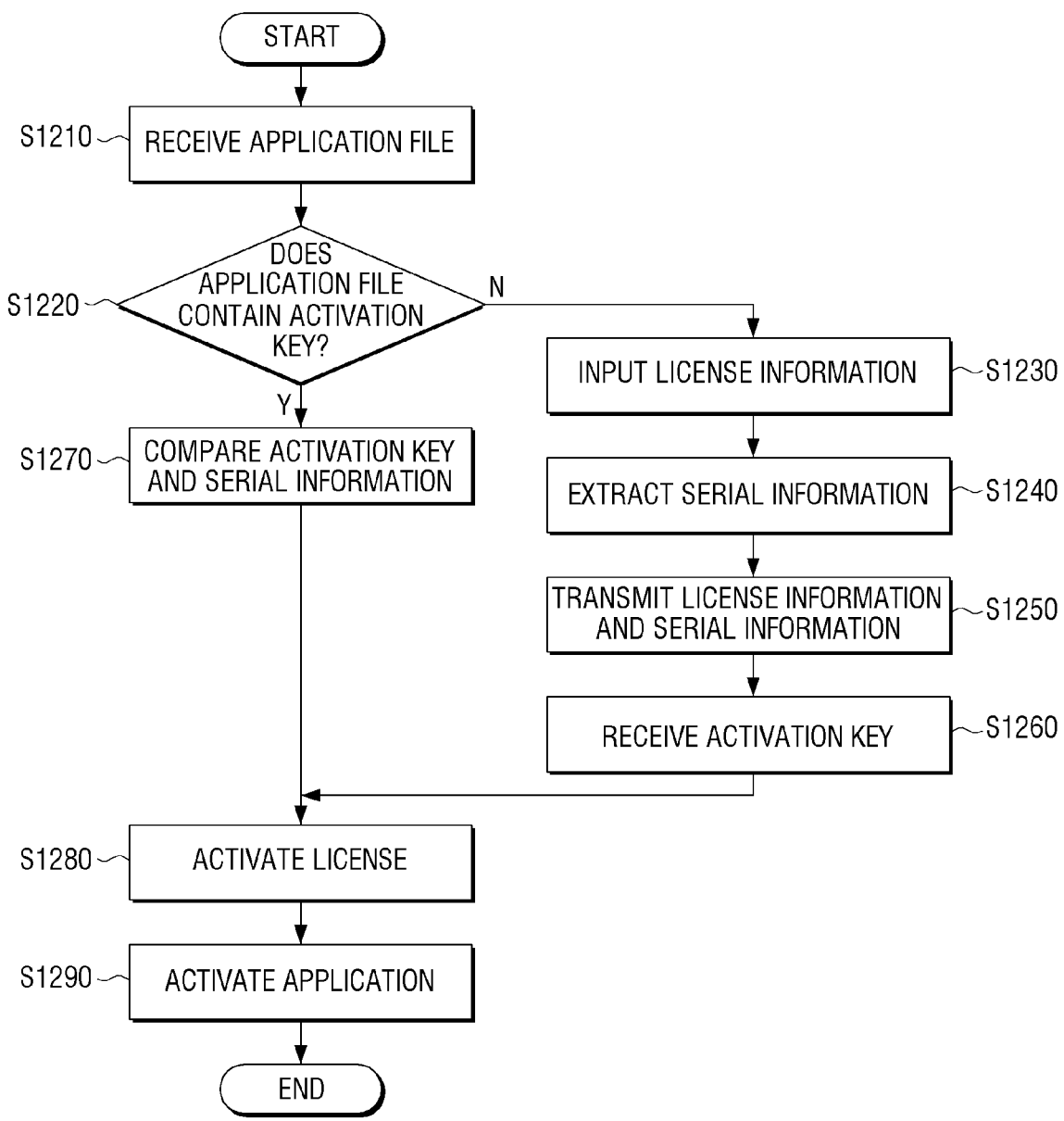
FIG. 12 is a flowchart illustrating a method for installing an application, according to an exemplary embodiment.

FIG. 12 is a flowchart illustrating a method for installing an application, according to an exemplary embodiment.

An application file is received (S1210). The application file may be installed. At this time, the application file may be an application file containing an activation key or may be an application file without an activation key.

Accordingly, it is determined whether the application file contains an activation key or not (S1220). If the application file does not contain the activation key (S1220-N), the related-art license activating method is performed. Specifically, license information of the application file is input by the user (S1230), apparatus information of the image forming apparatus 300, that is, serial information, is extracted (S1240), the license information and the serial information are transmitted to the license server 100 (S1250), and an activation key is received from the license server 100 (S1260).

If the application file contains the activation key (S1220-Y), a license of the application is authenticated using the activation key contained in the application file and the apparatus information of the image forming apparatus 300 (S1270). If a plurality of activation keys is contained in the application file, the license is authenticated for each of the plurality of activation keys.

If the license is authenticated, the license is activated (S1280) and the installed application is activated (S1290). If the license is not authenticated, the installed application is deleted or the installed application is activated, limiting the functions of the application in whole or in part.

As described above, the method for installing the application according to the exemplary embodiment receives the application file containing the activation key and installs and activates the application file. Accordingly, the user can activate the application without inputting separate license information and a separate activation key. The method for installing the application of FIG. 12 may be embodied on the image forming apparatus 300 having the configuration of FIG. 4 and may be embodied on an image forming apparatus having any other configuration.

The method for installing the application described above may be realized as at least one execution program to execute the method for installing the application and the execution program may be stored in a non-transitory computer readable recording medium.

Accordingly, each block of the present disclosure may be embodied as a non-transitory computer recordable code on a computer readable recording medium. The computer readable recording medium may be a device that can store data readable by a computer system.

The foregoing exemplary embodiments and advantages are merely exemplary and are not to be construed as limiting the present inventive concept. The exemplary embodiments can be readily applied to other types of apparatuses. Additionally, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus, comprising:
a communication interface to receive an application file capable of extending function of the image forming apparatus and containing an activation key;
an installation unit to install the received application file in the image forming apparatus;
an authentication unit to determine whether or not a license of an application corresponding to the installed application file is authenticated using the activation key contained in the application file and apparatus information of the image forming apparatus; and
a controller, including at least one processing device, to activate the installed application file when the license is authenticated, such that the extending function supported by the application corresponding to the installed application file is controlled,
wherein the activation key is an encryption key that is generated using the apparatus information of the image forming apparatus.

2. The image forming apparatus as claimed in claim 1, wherein the application file contains a plurality of activation keys,
wherein the authentication unit performs license authentication with respect to each of the plurality of activation keys.

3. The image forming apparatus as claimed in claim 1, wherein the apparatus information is a serial number of the image forming apparatus.

4. The image forming apparatus as claimed in claim 1, wherein, when the license is not authenticated, the controller activates the application, limiting functions of the application in whole or in part.

5. The image forming apparatus as claimed in claim 1, wherein, when the license is not authenticated, the controller deletes the installed application.

6. The image forming apparatus as claimed in claim 1, wherein the communication interface receives the application file containing the activation key through at least one of a portable storage medium, a license server, and a terminal apparatus connectable to the license server.

7. A license server which is connectible to at least one of a terminal apparatus and an image forming apparatus, the license server comprising:
a communication interface to receive license information of an application to be installed in the image forming apparatus and apparatus information of the image forming apparatus;
a key generator, including at least one processing device, to generate an activation key based on the license information and the apparatus information; and
a file generator to generate an application file containing application data capable of extending function of the image forming apparatus and the generated activation key, the application file corresponding to the application to be installed in the image forming apparatus, such that the extending function supported by the application corresponding to the installed application file is controlled by the image forming apparatus,
wherein the communication interface provides the generated application file to the image forming apparatus.

8. The license server as claimed in claim 7, wherein the apparatus information is a serial number of the image forming apparatus.

9. A terminal apparatus which is connectable to an image forming apparatus and a license server, the terminal apparatus comprising:
an information collector, including at least one processing device, to obtain apparatus information of the image forming apparatus;
a user interface to select an application to be installed in the image forming apparatus; and
a communication interface to transmit license information of the application and the apparatus information of the image forming apparatus to the license server and receive an application file capable of extending function of the image forming apparatus and containing activation information,
wherein the communication interface provides the application file to the image forming apparatus so that the extending function supported by the application corresponding to the installed application file is controlled by the image forming apparatus.

10. The terminal apparatus as claimed in claim 9, wherein the terminal apparatus is connectable to a plurality of image forming apparatuses,
wherein the information collector obtains apparatus information of the plurality of image forming apparatuses,
wherein the communication interface transmits license information of an application to be installed in the plurality of image forming apparatuses and the apparatus information of the plurality of image forming apparatuses to the license server, receives an application file for each of the plurality of image forming apparatuses, and provides the application file to the image forming apparatus corresponding to the application file.

11. A method for installing an application of an image forming apparatus, the method comprising:
receiving an application file capable of extending function of the image forming apparatus and containing an activation key, the application file corresponding to the application;
installing the received application file in the image forming apparatus;
determining, by at least one processing device, whether or not a license of an application corresponding to the installed application file is authenticated using the activation key contained in the application file and apparatus information of the image forming apparatus; and
activating the installed application when the license is authenticated, such that the extending function supported by the application corresponding to the installed application file is controlled,
wherein the activation key is an encryption key that is generated using the apparatus information of the image forming apparatus.

12. The method as claimed in claim 11, wherein the application file contains a plurality of activation keys,
wherein the authenticating comprises performing license authentication with respect to each of the plurality of activation keys.

13. The method as claimed in claim 11, wherein the apparatus information is a serial number of the image forming apparatus.

14. The method as claimed in claim 11, wherein the activating further comprises, when the license is not authenticated, activating the application, limiting functions of the application in whole or in part.

15. The method as claimed in claim 11, further comprising, when the license is not authenticated, deleting the installed application.

16. The method as claimed in claim 11, wherein the receiving comprises receiving the application file containing the activation key through at least one of a portable storage medium, a license server, and a terminal apparatus connectable to the license server.

17. The method of claim 11, wherein when the application file contains the activation key, the activation key and serial information are compared, and when the application file does not contain the activation key, license information is inputted and the activation key is received.

18. A method for providing an application file of a license server which is connectable to at least of a terminal apparatus and an image forming apparatus, the method comprising:
receiving license information of an application to be installed in the image forming apparatus and apparatus information of the image forming apparatus;
generating, by at least one processing device, an activation key based on the license information and the apparatus information;
generating an application file capable of extending function of the image forming apparatus and containing the generated activation key, the application file corresponding to the application to be installed in the image forming apparatus; and
providing the generated application file to the image forming apparatus so that the extending function supported by the application corresponding to the installed application file is controlled by the image forming apparatus.

19. The method as claimed in claim 18, wherein the apparatus information is a serial number of the image forming apparatus.

20. A method for providing an application file of a terminal apparatus which is connectable to an image forming apparatus and a license server, the method comprising:
obtaining apparatus information of the image forming apparatus;
selecting, by at least one processing device, an application to be installed in the image forming apparatus;
transmitting license information of the application and the apparatus information of the image forming apparatus to the license server;
receiving the application file capable of extending function of the image forming apparatus and containing activation information; and
providing the received application file to the image forming apparatus so that the extending function supported by the application corresponding to the installed application file is controlled by the image forming apparatus.

21. A non-transitory computer readable recording medium comprising a program to execute a method for installing an application of an image forming apparatus, the method comprising:
receiving an application file capable of extending function of the image forming apparatus and containing an activation key;
installing the received application file in the image forming apparatus;
determining whether or not a license of the application is authenticated using the activation key contained in the installed application file and apparatus information of the image forming apparatus; and activating the installed application when the license is authenticated, such that the extending function supported by the application corresponding to the installed application file is controlled, wherein the activation key is an encryption key that is generated using the apparatus information of the image forming apparatus.

* * * * *